United States Patent Office 3,271,545
Patented Sept. 6, 1966

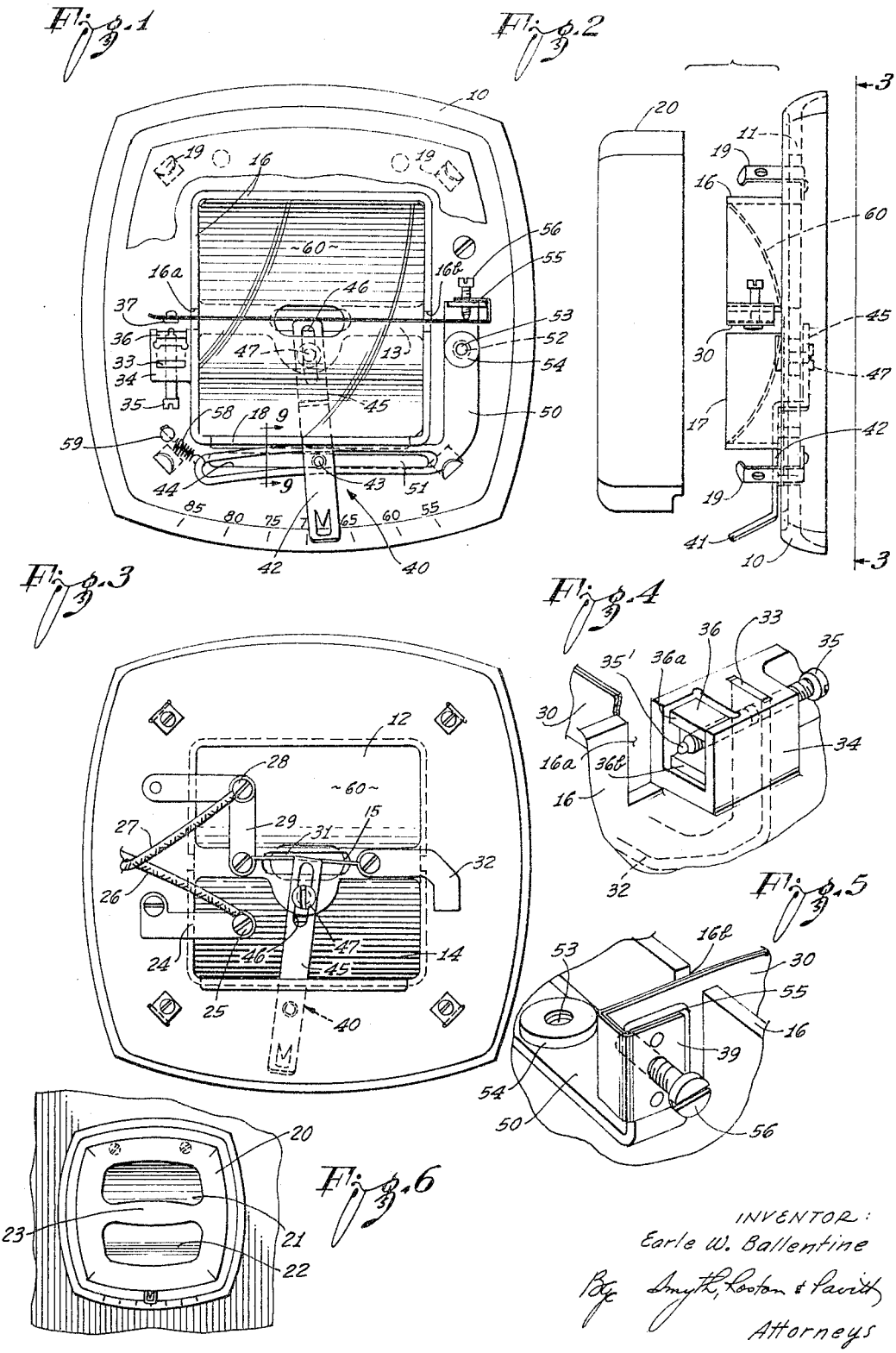

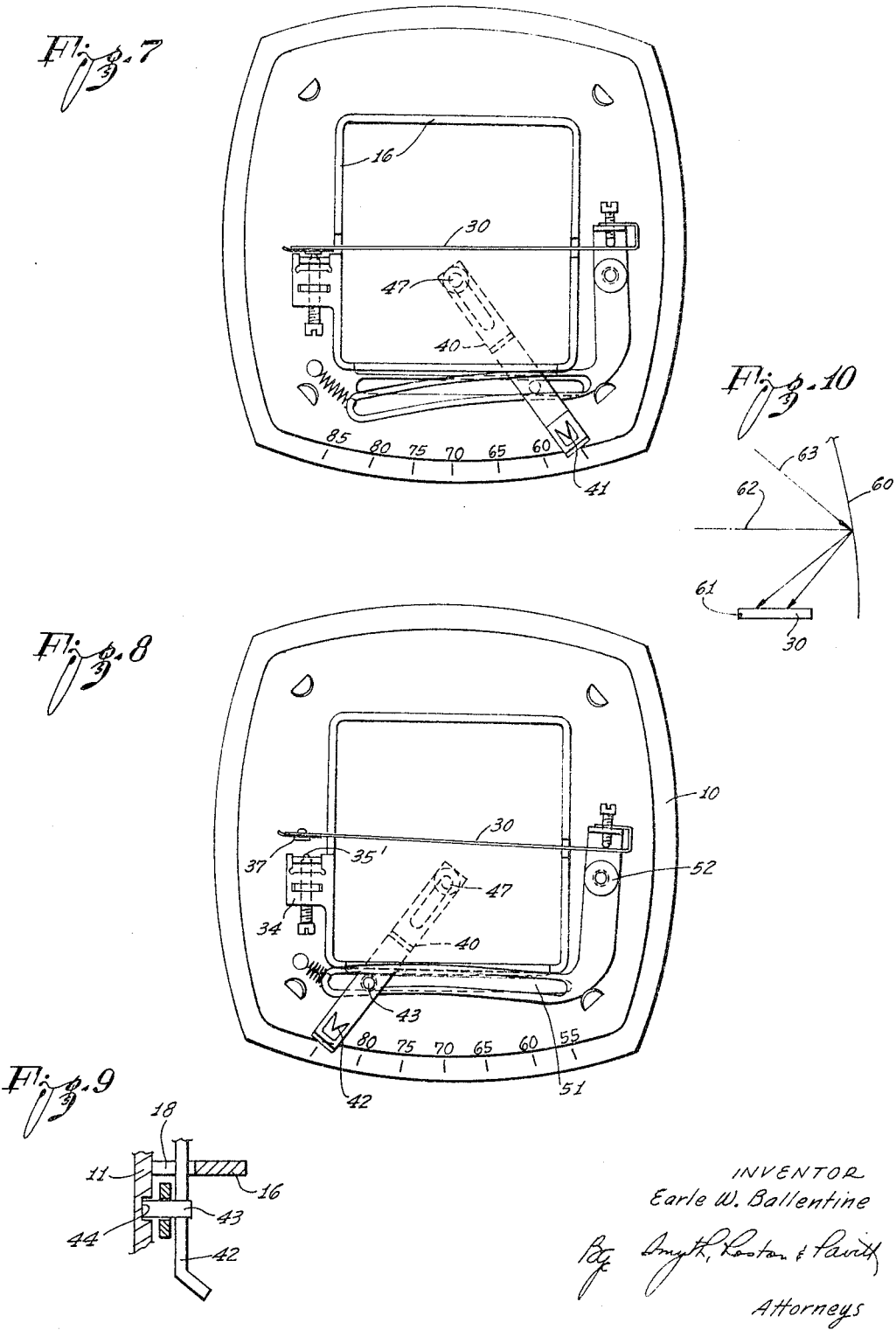

3,271,545
RADIATION AND CONVECTION RESPONSIVE
THERMOSTAT
Earle W. Ballentine, 27 Packet Road,
Portuguese Bend, Calif.
Filed Jan. 23, 1964, Ser. No. 339,759
16 Claims. (Cl. 200—138)

The present invention relates to a thermostat, particularly to a room thermostat, that is responsive not only to heat convection and conduction but also to any change in the radiation exchange between the room wherein it is placed and the environment thereof.

The degree of comfort which an individual will experience in a given environment will depend not only on the temperature, the humidity, and the motion of the air, but also on the temperature of other objects. An individual will gain or lose heat from or to the environment not only by conduction but also by radiation exchange with other objects. This radiation exchange exists in addition to the sensible heat flow by convection and by the loss of latent heat caused by evaporation of perspiration.

As long as the effective temperature of the air and the object with which the body is in heat-exchange relationship is below the normal body temperature, that is, below 98.6° F., the body of the individual will depend on the methods of radiation and convection to maintain normal blood temperature. If the ambient temperature is, for example, 70° F., a normal, sedentary, clothed individual whose average body-surface temperature is about 81° F. will lose 160 B.t.u. per hour by convection. In winter the flow of heat to the outside air will lower the inside temperature of all surfaces in the path of the flow of heat. These cold surfaces receive heat from the body of each occupant by the process of radiation, but the body receives less radiation from such cold surfaces than it does during the summer months from the same surfaces. Accordingly, at similar air temperatures the total amount of heat received by radiation differs around the year, due to differences in the temperature of the surfaces facing the individual but not directly contacting him. This is particularly evident in rooms having large glass windows or even glass walls.

In the summer months, a person in such a room will receive heat energy not only by direct contact with the air but also by radiation entering the room directly through the window. The body adapts to the total amount of heat energy received to establish its equilibrium and maintain the necessary blood temperature.

In the winter months, assuming that the air temperature in the room is the same as in the afore-described summer situation, the amount of heat radiation entering the window or glass wall is considerably reduced, so that the heat energy that the body receives is less than during the summer months. This is the reason why even at similar air temperature the body loses, in effect, more heat when the outside is cold. Accordingly, it has been found that the human body often produces a sensation of chilliness and discomfort in normally comfortable air temperatures.

The known thermostats are responsive only to convection of air, particularly of the air in the region contiguous to the thermostat. Furthermore, the conventional thermostat might respond to the temperature of the wall to which it is attached. However, the conventional room thermostats are only negligibly responsive to any change in the radiation energy penetrating the room.

It is an object of the present invention to devise a thermostat in the following description called a "solar eye," which is responsive not only to heat convection and conduction but, additionally, to a radiation exchange between its temperature-responsive element and its environment.

It is another object of the present invention to provide a temperature-responsive electric control element that operates at a thermal equilibrium established by heat convection, heat conduction, and an elevated rate of thermoradiation exchange with surfaces facing such a temperature-responsive element.

According to one aspect of the present invention in a preferred embodiment thereof, it is suggested that a temperature-responsive element be provided, such as a bimetallic bar, with a radiation-emitting coating, particularly a coating having an emissivity which is increased considerably over the naturally inherent emissivity of the temperature-responsive element itself. The emissivity should exceed 0.6. In addition, means are provided, such as curved mirrors or other optical elements, to place the coated surface of this temperature-responsive element into thermoradiation-exchange relationship with an ambient surface, for example, a wall of the room, whereby the "solar eye" is mounted on the opposite wall. Preferably, a cylindrical reflector is used for focusing the ambient radiation onto the coated surface. It is further suggested that the bimetallic bar which is coated with a highly emissive material be placed into a plane as defined by the center of the cylindrical reflector, and the focal line thereof. Opposite the cylindrical reflector there is provided a window through which passes radiation to and from a surface with which the bimetallic bar and the coating thereon are in heat-exchange relationship. The bimetallic bar is positioned with respect to the reflector so that heat conduction to the bimetallic bar from the air is not hampered. The outermost edge of the bimetallic bar is positioned so as to project slightly beyond the focal point or line of the cylindrical reflector; the innermost edge of the bar is positioned rather close to the central region of the cylindrical reflector.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

FIG. 1 illustrates the front view of a "solar eye" according to a preferred embodiment of the invention, with a front cover thereof being removed;

FIG. 2 illustrates the "solar eye" in side elevation, with the front cover removed;

FIG. 3 illustrates a rear view of the "solar eye" illustrated in FIGS. 1 and 2;

FIG. 4 illustrates a perspective view of the stationary contact in the "solar eye" and including its means of adjustment;

FIG. 5 illustrates in perspective view and in detail the connecting structure of a bimetallic strip constituting the primary temperature-responsive control element of the "solar eye";

FIG. 6 illustrates the "solar eye" as it is installed at a wall with the front cover placed on top;

FIGS. 7 and 8 show views somewhat similar to that of FIG. 1 but with two different extreme positions of a manually adjustable handle;

FIG. 9 illustrates the cross-sectional view in the planes 9—9 shown in FIG. 1; and FIG. 10 illustrates schematically the optical relation between incoming and outgoing radiation, the cylindrical reflector, and the radiation-emitting and absorbing bimetallic bar.

Proceeding now to the detailed description of the drawings, there is shown a somewhat square-shaped base member 10 having slightly curved sides and an inner separating wall 11, with two windows 12 and 14 separated by a horizontally extending traverse 13 having a slot 15. In the following description, the term "horizontal" is used only for convenience and with reference to the illustrations. The "solar eye" has no preferred orientation as far as horizontal or vertical is concerned.

Along the marginal lines of the two windows 12 and 14, excluding that pertaining to the traverse 13, there are projecting outwardly four integral walls forming a square-shaped open box structure 16 and defining a rectangular entrance window 17. There is a longitudinal slot 18 in between the lower wall of a box 16 and the dividing wall 11; and there are two registering transverse slots 16a and 16b in opposite side walls. Four flat arms 19 are screwed rearwardly into the dividing wall 11, and they individually project through slots provided at the four corners of the wall 11. These four arms 19 protrude through these slots and extend in the direction of the window 17. These flat arms 19 serve as clamping support for a cover 20 having two windows 21 and 22, with a horizontal traverse 23 being positioned in aligned relationship with the traverse 13 whenever the cover 20 is being placed and seated on the arms 19. Windows 21 and 22 permit the entrance of radiation into the main window 17.

An L-shaped connecting arm 24 is screwed to the wall 11, which arm 24 is provided with a clamping or locking screw 25 for securing a cable 26 to arm 24, thus making electrical connection therewith. A second cable is denoted with reference numeral 27 and connects to a screw 28, which is supported by a second L-shaped connecting arm 29.

An electrical connection is being made between the L-shaped arm 24 and a supporting structure for a bimetallic strip or bar 30, which supporting structure is illustrated in detail in FIG. 5 and will be described more fully below.

A connecting wire 31 extends across slot 15 and leads from one extremity of arm 29 to a flat double L-shaped connecting piece 32. The wire 31 may be replaced by a resistor for heat anticipation, which is known per se for thermostat control devices. A portion of connecting piece 32 extends through an aperture in wall 11 and terminates in a contact piece 33, which is received in a slot of a member 34 which is integral with the box structure 16. The supporting member 34 is further traversed by a threaded bore receiving a screw 35. The tip 35' of screw 35 serves as adjustable stationary contact. As can be seen best from FIG. 4, screw 35 also traverses contact piece 33 and makes electrical contact therewith. Member 34 further has a pocket, receiving a permanent magnet 36. This magnet may, for example, be an alnico magnet, and it has a central bore through which passes screw 35. Magnet 36 has two pole shoes 36a and 36b symmetrically disposed to screw 35. Pole shoes 36a and 36b define a common plane. Contact-tip surface 35' may either be positioned in this plane or projected therethrough. The stationary contact 35' cooperates with an opposing contact 37 which is seated on the extreme arm of bimetallic strip or bar 30. It will be appreciated that, by adjusting the screw 35, the distance between the contacts 35' and 37 can be adjusted. Such adjustment is carried out prior to the final installation of the novel thermostat control device.

For purposes of manually setting the thermostat, there is provided a lever 40 having a downwardly and outwardly extending handle portion 41, which is accessible even when the cover 20 is placed on top of the entire structure. There may be a temperature scale provided at base member 10, and handle 41 serves as an index or marker for presetting the temperature.

An upwardly directed arm portion 42 is integral with the handle 41, and a pin 43 is secured thereto, running in a horizontal slot 44 in the front part of dividing wall 11. The lever 41 is provided with a double bend, to terminate in a portion 45 which is provided with a slot 46, to receive pin or screw 47 serving as a pivot and being screwed into a tap projecting from the traverse 13.

It will be appreciated that, upon pivoting the lever 40 about the pivot 47, the effective lever arm has to be extended, because the pin 43 runs in the straight groove 44 so that the distance between the pin 43 and the pivot axis will be extended when lever 40 is either to the right or to the left of the straight down position. The slot 46 in the upper portion 45 of arm 40 accommodates this requirement for an increase in radius upon pivoting the lever arm 40 about the stationary axis as defined by the pivot 47, and the latter slides in slot 46 accordingly.

The pin 43 serves primarily as a guiding member for a cranked lever 50 which is of a double L-shaped form and having a slot 51 in its one long lever arm. Slot 51 receives pin 43.

This long lever arm with slot 51 is slightly curved, the reason for which will be explained below. A spring 58 is hooked to the extremity of the slotted portion of lever 50 and is hooked with its outer side to a lug 59 which, in turn, is secured to the wall 11. This spring 58 serves to maintain a positive engagement between the pin 43, the walls defining slot 51, and the groove 44. Whenever handle 41 is pivoted about pivot 47, the pin 43 runs in straight slot 44, thereby pivoting the long lever arm of lever 50 about its pivot axis 52. This pivot axis 52 is constituted by the center axis of a screw 53, penetrating the wall 11 and also being used to fasten the electrical connecting arm 24 to the rear surface of wall 11.

A roller-type element 54, which is attached to a lever 50, serves as a bearing member for the stationary screw 53, so that, in fact, the lever arm 50 is being journaled on screw 53. It should be mentioned that the range of pivot angles traversed by lever 50 is so small that any axial displacement relative to the axis of screw 53 is not noticeable.

The upper portion of the lever 50 serves as support for the bimetallic strip or bar 30, as is best illustrated in FIG. 5. The lever 50 has a bent portion 55 which is inclined to project outwardly, away from wall 11. The bent portion 55, furthermore, extends in a plane parallel to the plane of general extension of bimetallic strip 30, which in the present case coincides with the horizontal plane. The bimetallic strip or bar 30 is bent back to form a hook with a flat end element 39 seated upon bent portion 55. A screw 56 attaches this flat end portion 39 of bar 30 to the bent portion 55 of lever 50 and thus serves for fastening these two elements together.

The tip of screw 56 bears against the main body of bimetallic strip 30 and in its plane of general extension. Upon adjusting the screw 56, the tension of the bimetallic strip can be adjusted.

Screw 53, which journals the bent lever 50, thereby establishes a double arm lever. The long lever arm can be swiveled by the pin 43 upon rotating the handle 41 about its pivot 47. Upon adjusting handle 41, the two mutually secured members 55 and 39 follow such pivot motion, thereby, in effect, pivoting the bimetallic strip 30 about pivot axis 52, which pivot motion is a rotation in a plane extending perpendicular to the plane of extension of bimetallic strip 30. It will be appreciated that this latter pivot motion or rotation further adjusts the distance between the contacts 35' and 37, which, of course, is the ultimate purpose of adjusting handle 41. This adjustment serves as a mnaual setting and predetermination of the thermostat, and an appropriate scale is provided, with handle 41 serving as a movable index marker. The curvature of slot 51 is selected to establish a linear transfer between the angle of adjustment of handle 41 and the resulting angle traveled by contact 37, i.e., the tip of bimetallic bar 30.

FIGS. 7 and 8 illustrate in particular the two extreme positions of manual adjustment, which are also the extreme positions as far as the double arm lever 50 is concerned, with the bimetallic strip 30 faithfully following such lever movement.

It is a specific feature of the present invention that the surface of bar 30 is covered with a coating which is highly thermoemissive at normal room temperatures. In particular, a medium is selected for such a coating having "black body" characteristics insofar as feasible. Of course, "black body" characteristics are particularly interesting in the range of infrared rays, since at room temperatures there is maximum radiation in that range. A paint having a substantial content of carbon black and/or oxides of metal is suitable for the inventive purpose.

In view of the provision of this coating, a considerable amount of thermoradiation will be emitted therefrom. Since thermoradiation is primarily a surface phenomenon, the coating of bar 30 will determine the rate of emission, but the temperature of the bar proper will be responsible for the momentary effectiveness of the "gray body" type of radiation.

As already stated, the permanent magnet 36 has two pole shoe faces 36a and 36b, and these pole shoe faces are oriented to define a common horizontal plane. More particularly, these pole shoe surfaces are directed and oriented for engagement with the tip portion of bimetallic strip 30.

It will be appreciated that the magnet 36 serves to define a positive contact-making whenever, by thermal action, the tip of bimetallic bar 30 with contact 37 is sufficiently lowered towards the stationary counter contact 35'. Whenever the magnetic attracting forces exerted by magnet 36 upon the bimetallic strip 37 suffice to overcome the tension of the bimetallic bar 30, the latter will be attracted for snap-action type of contact-making between the contact pieces 35' and 37. Conversely, the contact opening will occur whenever the inner tension by the bimetallic strip is sufficiently strong to overcome the attracting force of permanent magnet 36. If contact surface 35' slightly projects above the plane defined by the pole shoes 36a and 36b, the bimetallic bar will never engage the magnet directly, so that contact breaking will not be impaired by too strong an attracting force.

The box or housing 16 serves as an enclosure for a cylindrical reflector 60. The bimetallic bar 30 traverses this box through slots 16a and 16b. The cylindrical axis of this reflector extends horizontally. Accordingly, the focal line of this reflector also extends horizontally. The curvature of the cylindrical mirror 60 has been selected so that this focal line still lies in bimetallic strip 30 whenever this bimetallic strip 30 is adjusted or bent by thermal action to a srict horizontal position.

As schematically shown in FIG. 10, this focal line 61, extending perpendicular to the plane of the drawing of FIG. 10, is close to the outer border of bimetallic bar 30, and the bar extends inwardly towards the reflector 60 and has its inner border close to the reflector 60. The more precise rule for this position of the bimetallic bar 30 can be given as follows: Always assuming that this bar is in a normal horizontal position, from which it deflects only by minute distances during operation of the "solar eye," the reflector 60 is positioned so that its cylindrical axis, which is the axis of curvature, and the focal line 61 define the plane which coincides with the horizontal plane. The bimetallic strip 30 is to be positioned to extend substantially in that plane.

The principal feature of this mirror is an optical cooperation with the bimetallic bar 30 in that radiation entering the "solar eye" through the window 17 and having a general frusto-conical configuration is being reflected towards the upper and lower surfaces of bimetallic strip 30.

As can be seen from FIG. 10, rays such as 62, which are parallel to the horizontal plane, will be reflected by reflector 60 towards the focal line 61; that is to say, such rays will be reflected towards the outer margin of bimetallic bar 30 but will still be recevied. Rays such as 63, in entering window 17 through an angle, will also be reflected onto the surface of bimetallic bar 30, but the reflection will affect the more interiorly positioned portions of bar 30. The radiation emitted from the specific emitting coating on bimetallic strip 30 will leave window 17 as a beam similar to that entering the window. It will be appreciated that the radiation beam entering window 17 for final absorption by bimetallic strip 30 has a shape or spatial configuration similar to that of the radiation beam first emitted by the coating on bimetallic strip 30 and then outwardly reflected by reflector 60. As one can see further, a certain portion of the radiation is permitted to enter through the window 17 to impinge directly on the bimetallic strip 30, and correspondingly some radiation of similar direction is permitted to leave through window 17 by direct emission of the coating on bimetallic strip 30 without being reflected by reflector 60.

It will be appreciated that window 17 and, of course, windows 21 and 22, when cover 20 is placed on top of base member 10, not only permit the passage of radiation into or out of the radiation chamber as formed by reflector 60, but also permit air to enter this chamber directly for purposes of convective heat exchange with bimetallic bar 30. It is thus important that the bimetallic bar is affected by convective heat as well as by thermoradiation, and its temperature is determined by both types of heat flow.

From the foregoing description, it will be apparent that the "solar eye" with reference to the appended drawings is responsive to convection as well as to radiation exchange between its active member, which is a coated bimetallic bar 30, and an ambient surface facing the windows 21 and 22. The width and height of the windows as well as the width and length of the bimetallic strip determine the extent of such radiation exchange. Since the bimetallic bar or strip is positioned in the plane which passes through both the center of curvature of reflector 60 as well as through the focal point of this reflecting surface, the maximum amount of radiation exchange is attained with the selected elements.

The "solar eye" will be positioned at the wall in a room opposite the wall having the largest window. A statistical analysis of four hundred architect-designed homes built since 1956 revealed that about 85 percent of the living rooms had one or more glass walls. About half of all the living rooms had only one glass wall, and about 40 percent of the living rooms had one and a half or two glass walls.

The heat exchange with the "solar eye" is therefore determined, among other factors, by the radiation entering the room through such a glass wall or walls as well as by the glass temperature itself. The window-glass temperature will be intermediate between the room temperature and the outside temperature. There will be an exchange of radiation between the bar and the window glass, which window glass has an emissivity of 0.92. Of course, this glass will also transmit radiation between the bimetallic bar and the outside earth, which has an emissivity of about 0.83. The temperature of the glass will vary with the wind, and it is apparent that an increased wind lowers the glass temperature. The extent of the radiation exchange between the window or glass wall, on the one hand, and the "solar eye," on the other hand, will depend on what is known as the angle factor, which is a dimensionless quantity and a function of the areas of the respective interacting surfaces facing each other and being in radiation-exchange relationship. In particular, the two surfaces defining the angle factor in any instance is, on the one hand, the glass window or wall positioned opposite the "solar eye" and also the total of the two windows 21 and 22 thereof.

In order to attain optimum results, it is not exactly necessary to use different "solar-eye" windows for each different size of the glass walls, but average sizes can be used for purposes of mass production, and any deviation from the average size contributes only little to a deviation from optimum results.

As stated above, the two sides of the bimetallic bar or strip are coated with a material having an emissivity corresponding to that of carbon black, which is about 0.90 to 0.92. This emissivity is twice that of the usual high-activity bimetallic materials. In the embodiment described, the cross-sectional area of the flux of the radiation entering the solar-eye windows 21 and 22 is about two and a half times the area of one side of the bimetallic bar 30. The combination of a reflector and a bar with a high-emissivity coating thus produces the magnification of about 5 to 1 of the radiant energy absorbed by the bar compared to the radiant energy that would be absorbed by an uncoated bar if placed in the normal direction of the same radiant flux. The net exchange of radiation between the bimetallic bar 30 and other ambient objects at lower temperature will result in a loss of heat by the bar, since the bar will emit more radiation energy than it receives. As a result of this heat loss, the bimetallic bar temperature is being lowered, and there will commence a convective heat flow from the warmer contiguous air to the bar. Likewise, there will be a heat flow from the warmer thermostat base and its surrounding walls to the bimetallic bar by conduction. The equilibrium bar temperature is the temperature maintained when the radiant energy loss is equal to the sum of the convective and conductive heat energy gain. In other words, an equilibrium temperature is established for the bimetallic bar when the relatively higher radiant energy that the emissive coating emits is equal to the sum of the relatively lower radiant energy received from the outside, plus the convective flow of heat from the warmer contiguous air, and the conductive heat energy flowing to the bar through solid material which is in direct heat-conductive relationship to the bimetallic bar 30.

It will be appreciated that this equilibrium temperature of the bar will be lower in comparison with the temperature of the air of the room only if the ambient surface with which the bimetallic bar is in radiation-exchange relationship is cooler than the bar. If this ambient wall is warmer, or if higher temperature radiation passes through a window onto the bar, then the bimetallic bar will gain heat energy, and its equilibrium temperature will be higher than that of the air in the room. The controlling factor here is the outside temperature. It is important that the thermostat, when used for controlling a furnace, will usually operate when there is a rather low outside temperature, so that, in fact, equilibrium for the bimetallic bar is established at a temperature lower than the room air temperature. The opposite condition can be used to control air conditioning in summer. The equilibrium bar temperature change—that is, the difference in temperature between the bimetallic bar at equilibrium and the temperature of the surrounding air in the room—is established when the radiant energy loss (or gain) that is the difference between the emitted radiant energy and the radiant energy received by the "solar eye" is equal to the sum of the convective and conductive heat energy gain (or loss). Convection and conduction is, of course, possible only when there is a temperature difference between the immediate environment and the bimetallic strip. When the temperature of the bimetallic strip equals that of the surrounding air, the radiant energy emitted equals the radiant energy received, and there is no convection or conduction.

The sum of convective and conductive heat energy was calculated to about .01 to .02 B.t.u.-$H_r$-ft.sq.-degrees Fahrenheit for 1 degree change in bar temperature. The equilibrium bar temperature change can be increased by reducing the flow of heat by conduction between the bar and the thermostat base. In other words, the equilibrium bar temperature change can, to some extent, be controlled by the degree of conduction permitted between the bimetallic strip and the solid element of its immediate environment. It was found that a bar equilibrium temperature change of about 4.7° Fahrenheit could be observed at 10° Fahrenheit outside temperature and zero wind velocity.

The "solar eye" in accordance with the present invention, when used for controlling the furnace, does adapt the furnace control to any change in the radiation entering the room through the window; aside from this fact, it has been observed that the temperature differential, i.e., the degree with which the temperature is maintained constant in the room, is in fact lower than with the conventional-type thermostats, which are not responsive to radiation and emission.

The inventive embodiment as described is susceptible to modifications still employing the basic principles underlying the present discovery. For example, the temperature-sensitive element does not have to be a bimetallic element, but one can employ all those types of elements which are (1) capable of altering a physical characteristic with a change in temperature of the environment and which are (2) capable of being manufactured to provide a surface large enough to be covered with a coating that is highly emissive for thermoradiation.

For example, thermocouples of the conventional as well as the PN junction type can be made to have at least one large and flat thermocouple junction provided with vanes or other means for surface enlargement.

Thermometers of the type employing an expanding fluid, such as mercury or silicon oil, can be provided with container walls which are either highly radiation emissive themselves or which have a radiation-emissive coating on their outer walls.

The inventive control device described with reference to the drawings includes electric current control of the on-off type, but is sufficient for household furnace control. The employment of thermocouples of the PN junction type, as mentioned above, permits steady electric current control if a more accurate temperature control is desired. The invention further permits uses other than the control of furnaces or heating installations. For example, the solar eye can be used as a fire detector, which will respond to an undue increase in ambient temperature as well as to an undue increase of radiation as produced by flames. This latter feature is particularly important because the detection of radiation emitted by flames would occur instantaneously and without delay if a temperature rise due to convective heat transport were used as a flame or fire detector.

The invention is not limited to the embodiments described above, but all changes and modifications thereof not constituting departures from the spirit and scope of the invention are intended to be covered by the following claims.

What is claimed is:
1. A temperature-responsive control device comprising:
   a flat element having a thermoradiation-emitting coating and being capable of changing its configuration when subjected to a variable flow of conductive heat transfer;
   lever means for pivotally mounting said flat element, there being a curved slot in said lever means;
   a pivotally mounted handle having a pin extending into said slot for guidance therein and for pivoting said lever means upon pivoting of said handle; and
   optical means positioned to focus incoming radiation onto said flat element and the coating thereon.
2. A temperature-responsive control device comprising:
   a housing having an open window;
   a stationary contact mounted in said housing;
   a flat thermoemissive switching element capable of changing its configuration when subjected to a variable convective flow of air for heat exchange resulting from imbalance between radiation received and radiation emitted, such radiation and air passing through said window;
   contact means on said switching element cooperating with said stationary contact for contact making and breaking in dependence upon a change of configuration of said switching element;

means for mounting said flat switching element and said stationary contact to permit changing of the distance between said contact means and said stationary contact;

manually operable adjusting means linked to said mounting means for adjusting said distance; and optical means positioned to focus incoming ambient thermoradiation onto said flat element.

3. A temperature-responsive control device comprising:

a base member;

a lever pivotally mounted on said base member and having a long slotted lever arm;

a handle and pin arrangement guided in the slot of said lever arm for pivoting same;

a flat thermoradiation-emissive element capable of changing its configuration when subjected to a variable temperature;

adjusting means for mounting said flat element on said lever;

optical means positioned to direct and focus incoming radiation onto said flat element; and electrical circuit means responsive to any change in configuration of said flat element.

4. A temperature-responsive control device for the control of the temperature in a room, comprising:

an element capable of undergoing characteristic changes in its dimensions in dependence upon changes of its temperature, and having a surface which emits infrared radiation to a substantial degree;

enclosure means for said element having open-window defining means and a reflecting inner surface positioned opposite to said window for directing and concentrating radiation entering said enclosure means through said window onto said surface of said element, said window exposing said element to the convective flow of air through said window for heat exchange directly between the air in the room and said element; and switching means cooperating with said element to perform switching operations in dependence upon the temperature of said element.

5. A temperature responsive control device for the control of the temperature in a room, comprising:

means defining a reflecting surface, for reflecting ambient radiation and concentrating the reflected radiation in a particular region;

an element capable of undergoing characteristic changes in dependence upon changes of its temperature and having a surface which emits infrared radiation to a substantial degree;

means for mounting said element so that said surface of said element is located in said particular region, said mounting means exposing said element to convective flow to air for heat exchange directly between said element and the air in the room; and means responsive to characteristic changes of said element to perform control operations.

6. A temperature responsive control device for the control of the temperature in a room, comprising:

a housing having an aperture through which air may pass and through which radiation may pass substantially non-absorbed during passing;

a reflector in said housing oriented to concentrate radiation entering said housing through said aperture into a particular region the region having predominantly a two-dimensional extension;

an element having a surface positioned in said region to receive said concentrated radiation, and to enter into heat exchange with air passing through said aperture, the surface of said element having a high emissivity of infrared radiation, said element undergoing characteristic changes upon a change of its temperature; and means responsive to said characteristic changes of said element for performing switching operations in cooperation with said element.

7. A control device as set forth in claim 6, comprising in addition, a traverse extending across said aperture along a line included in said two dimensional extension.

8. A temperature responsive control device for the control of the temperature in a room, comprising:

an element having a thermoradiation emissive surface, said surface having dimensions so that at room temperatures particular quantities of radiation are emitted;

means for mounting said element to expose said elements for direct heat exchange between said element and the air in the room through convective flow;

means for concentrating radiation exchange between said element and ambient sources the temperatures of which vary substantially independently from the room air temperature and the temperature of the element; and means responsive to change in temperature of said element.

9. A temperature responsive control device for the control of the temperature in a room, comprising:

a housing having an aperture for the passage of air and radiation;

a reflector in said housing mounted adjacent said aperture and concentrating radiation which passes into said housing through said aperture in a particular region;

an actuator having a temperature dependent configuration and having a surface extending in said region, said surface having a high infrared emissivity; and means responsive to particular changes in the configuration of said actuator to perform switching operations in cooperation with said actuator.

10. A temperature responsive control device for the control of the temperature in a room, comprising:

a housing having an aperture for the passage of air and radiation;

a reflector in said housing mounted adjacent said aperture and concentrating radiation which passes into said housing through said aperture in a substantially two dimensional region;

a thin, bimetallic element mounted in said housing and being exposed to air passing through said aperture and having two oppositely oriented surfaces extending substantially in said region, at least one of said surfaces having a high emissivity for infrared radiation; and means responsive to temperature dependent deflections of said element.

11. A temperature responsive control device for the control of the temperature in a room, comprising:

means defining a reflecting surface, for reflecting ambient radiation and concentrating such reflected radiation in a particular region;

an element capable of undergoing characteristic changes in dependence upon changes of its temperature and having a surface which emits infrared radiation to a substantial degree;

means for mounting said element so that said surface of said element intercepts a substantial portion of radiation as reflected and concentrated by said reflecting surface, said mounting means exposing said element to convective flow of air for heat exchange directly between said element and the air in the room; and means responsive to characteristic changes of said element to perform switching operations.

12. A temperature-responsive control device comprising:

a curvilinear reflector including supporting means for the reflector surface thereof;

a bimetallic element capable of changing its configuration when subjected to variable ambient temperatures and having a thermoradiation-emitting surface as at least one of its surfaces, said surface of said element extending substantially in a region of high energy density as produced by said reflector;

means defining an open window and being positioned opposite to said reflector for substantial non-absorbing radiation exchange via said reflector surface through said window, and exposing said element to a convective flow of air for direct heat exchange of the element, with air flowing through said open window; and means responsive to any change of configuration of said element.

13. A temperature responsive control device for the control of the temperature in a room, comprising:

a housing having an aperture for the passage of air and radiation;

an element mounted in said housing so as to be exposed to air passing through said aperture and having a highly infrared-emissive surface, smaller than the size of said aperture, said element undergoing detectible characteristic changes upon variations in its temperature;

reflecting means in said housing mounted to reflect and concentrate radiation entering said housing through said aperture, onto said surface of said element; and means responsive to said characteristic changes for performing control operations.

14. A temperature responsive control device for the control of the temperature in a room, comprising:

a housing having an aperture for the passage of air and radiation;

a reflector in said housing mounted adjacent said aperture and concentrating radiation which passes into said housing through said aperture in a substantially two dimensional region;

an actuator having a temperature dependent configuration and having a surface extending in said region said surface having a high infrared emissivity; and means responsive to particular changes in the configuration of said actuator to perform switching operations in cooperation with said actuator.

15. A temperature responsive control device for the control of the temperature in a room, comprising:

a housing having an aperture for the passage of air and of radiation;

a thermoradiation emissive element mounted in said housing at a location reached by only a small amount of radiation as entering said housing directly;

a reflector positioned to reflect and concentrate said radiation onto said element; and means responsive to any change in temperature of said element.

16. A temperature responsive control device for the control of the temperature in a room, comprising:

a thin bimetallic switching element having an infrared emissive surface, the temperature of said element directly determining the emission of radiant energy and the configuration of the element;

means for mounting said element for direct exposure to the air in the room for heat exchange between the surface of said element and the air in the room by convective flow of air, and reflector means for directing and concentrating ambient radiation onto said surface, to establish a thermal equilibrium in which the amount of radiation received is predominantly determined by temperature prevailing external to the air of the room.

References Cited by the Examiner

UNITED STATES PATENTS

| | | | |
|---|---|---|---|
| 2,083,317 | 6/1937 | Dallenbach | 73—355 |
| 2,410,421 | 11/1946 | Brady | 200—138 |
| 2,714,668 | 8/1955 | Zinn | 250—83 |
| 2,723,082 | 11/1955 | Carlson | 200—138 X |
| 2,826,072 | 3/1958 | Kliever | 73—355 |
| 2,835,779 | 5/1958 | Kazan | 200—122 X |
| 2,867,703 | 1/1959 | Koslow | 200—138 |
| 2,928,606 | 3/1960 | Lee | 236—80 X |
| 2,935,711 | 5/1960 | Christensen | 73—35 X |

BERNARD A. GILHEANY, *Primary Examiner.*

L. A. WRIGHT, *Asistant Examiner.*